United States Patent [19]

Weinert, Jr. et al.

[11] 4,389,334
[45] Jun. 21, 1983

[54] SUPPORTED CATALYSTS USEFUL FOR THE POLYMERIZATION OF ALPHA-OLEFINS

[75] Inventors: Raymond J. Weinert, Jr.; Kenneth C. Benton, both of Garfield Heights, Ohio

[73] Assignee: The Standard Oil Company, Cleveland, Ohio

[21] Appl. No.: 221,667

[22] Filed: Dec. 31, 1980

[51] Int. Cl.³ .............................................. B01J 31/02
[52] U.S. Cl. ............................ 252/429 B; 252/431 C; 252/431 R; 526/151; 526/125; 526/142
[58] Field of Search ........... 252/429 B, 431 R, 431 C; 526/151, 125

[56] References Cited

U.S. PATENT DOCUMENTS 4,161,462  7/1979  Bocharov et al. .............. 252/429 B
4,268,418  5/1981  Hoff ................................ 252/429 B Primary Examiner—Jacqueline V. Howard
Attorney, Agent, or Firm—William D. Mooney; Herbert D. Knudsen; Larry W. Evans

[57] ABSTRACT

This invention relates to a supported catalyst and to the use of this catalyst in a process for the polymerization of alpha-olefins. The catalyst comprises a transition metal complex supported on an interpolymer comprising an alpha, beta-unsaturated dicarboxylic acid, anhydride or lower alkyl ester thereof, and one or more monomers copolymerizable therewith which has been treated with a Group IIA halide or alkyl halide. Preferred supports comprise maleic anhydride copolymers which have been treated with a magnesium compound.

10 Claims, No Drawings

SUPPORTED CATALYSTS USEFUL FOR THE POLYMERIZATION OF ALPHA-OLEFINS

BACKGROUND OF THE INVENTION

The polymerization of alpha-olefins by transition metal complexes, i.e. Ziegler-type catalysts, has been practiced since the 1950's. Over the years, many support materials such as silica, alumina, Group IIA metal halides and hydroxy halides have been used with Ziegler-type catalysts. However, catalysts containing these support materials require careful and extensive preparation procedures. Moreover, there is still a need for catalysts which are more active and which produce more highly stereo regular polymers.

The practice of the instant invention offers several advantages including: (1) the supports are readily available materials; (2) Ziegler-type catalysts containing these supports are more active than prior art catalysts; and (3) these catalysts are less sensitive to oxygen and water than prior art supported catalysts.

SUMMARY OF THE INVENTION

This invention relates to novel supported Ziegler-type transition metal complex catalysts comprising (1) a compound of a transition metal of Groups IV to VIII, (2) an organic compound of a metal of Groups I to III, and (3) an interpolymer comprising an alpha, beta-unsaturated dicarboxylic acid, anhydride or lower alkyl ester thereof, and one or more monomers copolymerizable therewith which has been modified by contact with a compound of a metal of Group IIA. The preferred catalysts comprise (1) a titanium halide, alkyl halide or alkyl, (2) an aluminum alkyl or alkyl halide, and (3) a copolymer of maleic anhydride and a olefinic cyclic hydrocarbon which has been modified by contact with a magnesium halide or alkyl halide.

Moreover, it has also been discovered that alpha-olefins can be polymerized by contacting an alpha-olefin with the above described catalyst at the appropriate reaction conditions.

DETAILED DESCRIPTION

Transition metal complex catalysts, i.e. Ziegler-type catalysts, in general, are prepared by the reaction of the transition metal compounds with organo metallic compounds. These solid heterogeneous catalysts contain active sites which polymerize alpha-olefins to high molecular weight polymers and which also control the manner of monomer addition. Generally speaking, each new alpha-olefin molecule is incorporated into the polymer chain in a manner identical to that of the preceeding molecule. This leads to regularity in structure and allows the polymer to crystallize.

These Ziegler catalysts may be formed by bringing together a transition metal compound in which the transition metal is in a valence state below its normal maximum, for example, titanium trichloride, and an organo metallic compound, for example, aluminum diethyl monochloride, which functions principally as an activator for the transition metal compound. Many forms of Ziegler catalysts have been proposed and, as is well known in the art, there are many transition metal compounds and organo metallic compounds which may be used to form Ziegler catalysts. Such catalysts may comprise more than one transition metal compound in combination with one or more organo metallic compounds.

Any transition metal compound in which the transition metal is present in a valence state below its normal maximum and which can function as an olefin polymerization catalyst may be used in carrying out the present invention. Preferably, transition metal halides, alkyl halides, alkoxides and alkyls may be used in this invention, wherein the transition metal is at least one of zirconium, vanadium, rhodium, hafnium, titanium and chromium. It is generally preferred to use titanium trichloride as the transition metal compound.

The organo metallic component is based on an element selected from the Group IA, IIA and IIIA of the Periodic Table and will usually be an aluminum compound. Preferably, the aluminum compound is an alkyl aluminum halide or an aluminum trialkyl wherein each alkyl chain contains less than 8 carbon atoms. Suitable aluminum compounds are aluminum triethyl, aluminum tri-n-propyl, aluminum tri-iso-butyl, aluminum diethyl monochloride and aluminum tri-n-hexyl.

These catalysts may be treated with a wide range of electron donors, including ethers, amides, esters, alkyl halides, halogens, interhalogen compounds, phosphines, phosphonitriles, alcohols, thiols, and thioethers which enhance the catalyst activity or stereo regularity. These additives are well known in the art.

This invention provides a novel support for the above described Ziegler-type catalysts. These transition metal complexes can be applied to the support by any of the convenient methods known in the art. Two such methods are ball milling the support with the transition metal complex and applying a solution of the transition metal complex to the support. The transition metal complex may be applied directly to the support or the transition metal can be added to the support with the complex being formed in situ.

These supports are non-rubbers and comprise an interpolymer composition containing an alpha, beta-unsaturated dicarboxylic acid, anhydride or lower alkyl ester thereof and at least one monomer copolymerizable therewith. Suitable alpha, beta-unsaturated dicarboxylic acid, anhydride or the lower alkyl esters thereof include those wherein a carbon to carbon double bond is in an alpha, beta position to at least one of the carboxy functions (e.g. itaconic acid, anhydride or lower ester thereof), and preferably in an alpha, beta position to both of the carboxy functions of the alpha, beta-dicarboxylic acid, anhydride or the lower alkyl ester thereof (e.g. maleic acid, anhydride or lower alkyl ester thereof). Normally, the carboxy functions of these compounds will be separated by up to 4 carbon atoms preferably 2 carbon atoms.

A class of preferred alpha, beta-unsaturated dicarboxylic acid, anhydride or lower alkyl esters thereof, include those compounds corresponding to the formula:

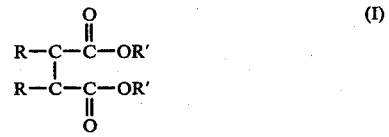

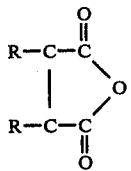

(including the geometric isomers thereof, e.g. cis and trans) wherein each R is independently hydrogen; halogen (e.g. chloro, bromo or iodo); hydrocarbyl or halogen-substituted hydrocarbyl of up to 8 carbon atoms, preferably alkyl, alkaryl or aryl; (preferably at least one R is hydrogen); and each R′ is independently hydrogen or lower alkyl of up to about 7 carbon atoms (e.g. methyl, ethyl, butyl or heptyl). These preferred alpha, beta-unsaturated dicarboxylic acids, anhydrides or the alkyl esters thereof contain a total carbon content of up to about 25 carbon atoms, normally up to about 15 carbon atoms. Typical examples include maleic acid; maleic anhydride; methyl maleic anhydride; propyl maleic anhydride; 1,2-diethyl maleic anhydride; phenyl maleic anhydride; benzyl maleic anhydride; chloro maleic anhydride; heptyl maleate; ethyl fumarate; fumaric acid; mesaconic acid; ethyl isopropyl maleate; isopropyl fumarate; hexyl methyl maleate; phenyl maleic anhydride and the like. These and other alpha, beta-unsaturated dicarboxylic compounds are well known in the art. Of these alpha, beta-unsaturated dicarboxylic compounds, maleic anhydride, maleic acid or fumaric acid or the lower alkyl esters thereof are preferred. Interpolymers derived from mixtures of two or more of any of these also can be used.

Suitable monomers copolymerizable with the alpha, beta-unsaturated dicarboxylic acid, anhydride or lower alkyl ester monomer described above are well known. Preferred monomers contain an olefinic cyclic structure. These monomers can be defined more clearly by the following general formulas:

wherein A is phenyl or norbonyl, wherein norbonyl can be represented by the following formula:

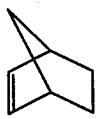

and wherein B is an alkyl group containing from 1 to about 6 carbon atoms and preferably from about 1 to 2 carbon atoms; D and E are each independently hydrogen, an alkyl, alkenyl, phenyl, substituted phenyl, nitrile, carboxyl, carboxylic ester or carboxylic amide group, or A, D and E taken together can form a cyclic group. Generally, these monomers will contain up to 12 carbon atoms.

A particulary preferred olefinic cyclic compound is a styrene. The term "a styrene" as used herein refers to styrene or any of the various substituted styrenes such as halogen and haloalkyl substituted styrenes, hydrocarbon substituted styrenes, alkoxy styrenes and alkyloxy styrenes. Examples of such substituted styrenes include alpha methyl styrene, 4-chloro styrene, 4-ethyl styrene, 2-methyl styrene, 2-phenyl styrene, 4-t-butyl styrene, 4-methoxy styrene, 2,4-dimethyl styrene, 4-isopropyl styrene, 2-methyl-4-chloro styrene, vinyl naphthylene, 2-methyl-4-benzyl styrene and mixtures thereof. In most instances, however, it is preferred to use styrene itself by reason of its low cost, commercial availability and excellence as a starting material for the preparation of the resin used in this invention.

Another particularly preferred olefinic cyclic compound is a norbornene. The term "a norbornene" as used herein refers to norbornene or any of the various substituted norbornenes such as halogen and haloalkyl substituted norbornenes, hydrocarbon substituted norbornenes, alkoxy norbornenes, alkyloxy norbornenes, etc. Examples of such substituted norbornenes include 5-norbornene-2,3-dicarboxylic acid, 5-norbornene-2,3-dicarboxylic anhydrides, 2-norbornene-5-carbonitrile, 5-methylene-2-norbornene and 5-ethylidene-2-norbornene. It is especially preferred to substitute the substituent at the 2 or 3 position of the norbornene.

Other preferred olefinic cyclic compounds which are useful in this invention include indene and dicyclopentadiene. Both of these compounds can also be substituted with substituents such as halogens and alkyls.

The interpolymer preferably will comprise about 50 molar parts of the alpha, beta-unsaturated dicarboxylic acid, anhydride or lower alkyl ester thereof and 50 molar parts of the monomer copolymerizable therewith. Methods for preparing these polymer resins are well known in the art and many of the polymer resins, e.g. styrene/maleic anhydride resins, are available commercially. An example of these polymerization reactions is found in U.S. Pat. No. 3,451,979 (maleic anhydride and styrene). Other examples are well known in the art. Other examples of such suitable interpolymerization are described in U.S. Pat. Nos. 2,938,016; 2,980,653; 3,085,994; 3,342,787; 3,418,292; 3,451,979; 3,558,570; 3,702,300; and 3,723,375. These patents are incorporated herein by reference for their teaching of the preparation of suitable interpolymers. Other preparative techniques are also known in the art.

It has also been discovered that in order for the resultant supported catalyst to have high activity the supports must be treated with a Group IIA metal halide or Group IIA IIA metal halide prior to contact with the transition metal complex. Preferably, the Group IIA metal is selected from the group consisting of magnesium and beryllium.

This Group IIA metal halide or Group IIA metal alkyl halide can be contacted with the support in any of the ways known in the art including suspending a finely divided support in a hydrocarbon, e.g. heptane, solvent. A solution of the Group IIA metal halide or Group IIA metal alkyl halide in an ether or hydrocarbon solvent, e.g. tetrahydrofuran, is added to the suspension. The amount of the Group IIA compound which is incorporated into the support will depend upon the composition of the support and upon the time and temperature at which the suspension is heated. Generally, the higher the temperature the shorter the time required to incorporate the Group IIA metal. Preferably, the suspension is heated at 50° to 200° C., more preferably 70° to 160° C., for 1 to 72 hours, preferably 6 to 24 hours.

The treated support is then resuspended in an inert hydrocarbon diluent. This diluent contains from 0 to 50%, preferably 10 to 40%, of an aluminum alkyl, halide or alkyl halide, which is also incorporated into the support.

The transition metal complex is then added to this suspension by any of the means known in the art. Normally, the transition metal compound is added to the suspension and the suspension is then heated. After a sufficient interval, the suspension is filtered under an inert atmosphere and washed with a hydrocarbon solvent. Finally, the supported catalyst is activated by the organo metallic co-catalyst.

The activated supported catalyst can be used as a dry powder or as a slurry in an inert hydrocarbon diluent. This catalyst can be used to polymerize alpha-olefins in solution, slurry, bulk monomer or gas phase under normal alpha-olefin polymerization conditions.

Suitable alpha-olefin reactants useful for this polymerization process include ethylene, propylene, butene-1, pentene-1, hexene-1 and 4-methyl pentene-1.

SPECIFIC EXAMPLES

The following examples illustrate the use of supported catalysts of this invention. Unless otherwise indicated, all parts and percentages are by weight.

All examples were conducted in 7 oz. crown cap pop bottles. The bottles were rinsed with distilled water and dried at 150° C. for at least 24 hours prior to use. The bottles were cooled in a decissator, capped and purged for 30 minutes with high purity argon via a needle inserted through the rubber septa. The septa had previously been extensively extracted with toluene and heptane and dried at approximately 50° C. under reduced pressure.

COMPARATIVE EXAMPLE A

Polymerization of Propylene with an Unsupported Ziegler-Type Catalyst

A clean, dry 7 oz. crown cap bottle was charged with 50 ml. of purified n-heptane, capped and purged for 10 minutes with argon by means of a needle inserted through the rubber septum. The reaction bottle was cooled to approximately 0° C. in an ice/water bath, and 0.45 ml of neat titanium tetrachloride (4.12 millimole) was injected into the bottle. The solution was agitated vigorously by means of a magnetic spin bar (placed in the bottom prior to capping) and 0.88 ml. of a 25 weight percent solution of triethyl aluminum in n-heptane (1.37 millimole triethyl aluminum) was added dropwise. The reaction bottle was then heated to 150° C. over 30 minutes, held for 2.5 hours at 150° C. and cooled to ambient temperature over 30 minutes. The purple slurry thus obtained was agitated for 10 minutes at ambient temperature, activated by the addition of 6.85 ml. of a 25 weight percent n-heptane solution of diethyl aluminum chloride (10.6 millimole) and agitated for 30 minutes at ambient temperature.

A 7 oz. crown cap bottle was charged with 50 ml. of purified n-heptane, capped and purged for 20 minutes with argon. 12.1 gms. of propylene were injected into the bottle, followed by 2.0 ml. of the activated catalyst slurry prepared above (0.29 mg-atom of titanium). The reaction bottle was agitated in a constant temperature bath at 70° C. for 3 hours. The unreacted propylene was vented and the catalyst was destroyed by injecting 2 to 3 ml. of methanol acidified with hydrochloric acid into the bottle. The polymer slurry was poured into approximately 500 ml. of methanol acidified with approximately 15 ml. of concentrated hydrochloric acid and stirred for 20 minutes while heating at approximately 50° C. The solid product was recovered by vacuum filtration, washed on the filter with methanol and dried for 18 hours at 55° C. under reduced pressure. The yield was 6.4 gms. of polypropylene, conversion was 59.1%, catalyst activity 307 g. PP/g·Ti·hr. and n-heptane insoluble fraction was 96.0%.

COMPARATIVE EXAMPLE B

Polymerization of an Alpha-Olefin with a Ziegler-Type Catalyst Supported on a Maleic Anhydride Copolymer which was not Treated with a Magnesium Compound This example demonstrates the effect of omitting the n-butyl magnesium chloride treatment of the poly-(maleic anhydride-co-5-ethylidene-2-norbornene) support.

Poly-(maleic anhydride-co-5-ethylidene-2-norbornene) (2 gms.) was suspended in 5 ml. (45.5 millimoles) of titanium tetrachloride, agitated for 24 hours at ambient temperature, heated for 1 hour at 155° C., cooled, filtered under argon and washed with n-heptane. The solid (0.5 gms.) was resuspended in 50 ml. of n-heptane and 9 millimoles of diethyl aluminum chloride was added. The slurry was then heated at 160° C. for 1 hour, cooled, filtered, and the solid was washed with n-heptane. The solid product was resuspended in 50 ml. n-heptane and 5 ml. of titanium tetrachloride were added. The suspension was heated for 1 hour at 160° C., cooled, filtered and washed with n-heptane. The final catalyst contained 5.3 weight percent titanium and 80 ppm magnesium.

The catalyst prepared above (0.4 gms.) was suspended in 50 ml. of purified n-heptane under argon in a 7 oz. crown cap pop bottle. The bottle was charged with 10.92 gms. (0.26 mole) of propylene and cooled in dry ice. The catalyst was activated with 6.4 millimoles of triethyl aluminum (Al/Ti=14.4), the system was allowed to warm nearly to ambient temperature, and the bottle was then placed in the constant temperature bath at 70° C. After 72 hours, no polymer was obtained.

COMPARATIVE EXAMPLE C

Polymerization of an Alpha-Olefin with a Ziegler-Type Catalyst Supported on a Maleic Anhydride Copolymer which was not Treated with a Magnesium Compound This examples illustrates the effect of omitting the n-butyl magnesium chloride treatment of the poly-(styrene-co-maleic anhydride) support.

Pulverized styrene/maleic anhydride copolymer (2.0 gms.) was suspended in 50 ml. n-heptane in a 7 oz. pop bottle. Titanium tetrachloride (10 ml.—90 millimoles) was added and the slurry was heated at 160° C. for 1 hour. The suspension was cooled, filtered, and the solid was washed with n-heptane.

The solid product obtained above (0.4 gms.) was suspended in 50 ml. of n-heptane and 44.3 millimoles of diethyl aluminum chloride were added. The suspension was heated for 1 hour at 160° C., cooled, filtered, and the solid product washed with heptane. The solid catalyst was 9.38% titanium and contained 70 ppm of magnesium as an impurity.

The catalyst prepared above (0.4 gms.) was suspended in 50 ml. of n-heptane under argon in a 7 oz. pop bottle. Propylene (11.5 gms.—0.27 mole) was charged and the bottle was cooled in dry ice. The catalyst was activated with 19.6 millimoles of triethyl aluminum (Al/Ti=25) and the polymerization was conducted as described in Comparative Example B. After 89 hours at 70° C., the yield was 0.37 gms. of polypropylene, the catalyst activity being 0.1 g PP/g Ti·Hr. The catalyst mileage was 9.9 g PP/g. Ti.

EXAMPLE 1

Polymerization of an Alpha-Olefin with a Ziegler-Type Catalyst Supported on a Magnesium Modified Maleic Anhydride Copolymer 5-ethylidene-2-norbornene-co-maleic anhydride polymer (2 gms.) was suspended in 50 ml. of n-heptane under argon and 15 ml. of a 2.7 molar solution of n-butyl magnesium chloride in tetrahydrofuran (40 millimoles of n-butyl magnesium chloride) were added. This suspension was agitated for 24 hours at ambient temperature, diluted with 50 ml. of purified n-heptane and heated at 160° C. for 2 hours. The solid product was recovered by filtration under argon and washed with n-heptane.

The magnesium modified copolymer (0.5 gms.) was resuspended in 50 ml. of n-heptane and 40.5 millimoles of titanium tetrachloride were added. The suspension was heated for 1 hour at 160° C., filtered and the solid product was washed with n-heptane.

The solid product produced above was resuspended in 50 ml. of n-heptane. Diethyl aluminum chloride (0.6 millimole) was added, the suspension was heated at 160° C. for 1 hour. The suspension was filtered and the solid was washed with n-heptane.

The solid product was again suspended in 50 ml. of n-heptane and 9.1 millimoles of titanium tetrachloride were added. The suspension was heated at 160° C. for 1 hour, filtered, and the solid product was washed with n-heptane. The solid catalyst was 6.1% titanium and 5.8% magnesium.

The solid catalyst prepared above (0.4 gms.) was suspended in 50 ml. of purified n-heptane under an argon atmosphere in a 7 oz. crown cap soda pop bottle. Propylene (14.27 gms.) was injected into the system, and the bottle was then cooled to −50° to −70° C. in dry ice. The catalyst was then activated by the injection of 6.4 millimoles of triethyl aluminum (Al/Ti=12.5) and the bottle was allowed to warm nearly to ambient temperature, in order to prevent breakage due to thermal shock, before placing the system in a constant temperature bath at 70° C. After the system was agitated for 8 minutes at 70° C., the unreacted propylene was vented and 3 ml. of methanol acidified with hydrochloric acid were injected to destory the catalyst. The slurry was poured into approximately 350 ml. of warm methanol acidified with hydrochloric acid. The solid polymer was recovered by filtration and dried for 18 hours at approximately 55° C. under reduced pressure. The yield was 11.0 gms. of polypropylene, 54% of which was insoluble in hot n-heptane. The conversion was 90.0% and the catalyst activity was 4,382 gms. polypropylene/gms. titanium·hour.

EXAMPLE 2

Polymerization of an Alpha-Olefin with a Ziegler-Type Catalyst Supported on a Magnesium Modified Maleic Anhydride Copolymer A poly(styrene-co-maleic anhydride) was reduced to a fine powder by ball milling at ambient temperature, and dried for 18 hours at 60° C. under reduced pressure. This pulverized copolymer (2 gms.) was suspended in 50 ml. of n-heptane under argon, and 15 ml. of a 2.5 molar solution (37.5 millimoles) of n-butyl magnesium chloride in tetrahydrofuran were added. The suspension was heated at 70° C. for 66 hours, filtered, and the solid product was washed with heptane. The solid was resuspended in 50 ml. of n-heptane and 30 millimoles of diethyl aluminum chloride were added. The suspension was heated at 160° C. for 1 hours, cooled, filtered, and the solid was washed with n-heptane. The solid was suspended in 50 ml. of n-heptane and 5 ml. (45.5 millimoles) of titanium tetrachloride, heated at 160° C. for 1 hour, filtered and washed with heptane. The final solid catalyst was 4.85% titanium and 6.0% magnesium.

The catalyst prepared above (0.1 gms.) was suspended in 50 ml. of n-heptane under argon in a 7 oz. crown cap pop bottle. Propylene (11.34 gms.—0.27 moles) was charged and the system was cooled in dry ice. The catalyst was activated with 8 millimoles of triethyl aluminum and the bottle was allowed to warm to approximately room temperature. The system was agitated at 70° C. for 8 minutes, the unreacted propylene was vented, and the product was recovered and dried as described in Example 1. The yield was 4.44 gms. of polypropylene, 52.% of which was insoluble in hot heptane. The conversion was 39.2% and the catalyst activity was 6,950 gms. of PP/gms. of Ti·hour.

EXAMPLES 3 THRU 5

Polymerization of an Alpha-Olefin with a Ziegler-Type Catalyst Supported on a Magnesium Modified Maleic Anhydride Copolymer These examples were run using procedures similar to those described above. In each case, the polymer support was treated with n-butyl magnesium chloride before the application of the titanium tetrachloride. The results are shown in Table I.

TABLE I

Polymerization of Alpha-Olefins With a Ziegler-Type Catalyst Supported on a Magnesium Treated Maleic Anhydride Copolymer

| Exam | Support | Activ $\left(\frac{g\ PP}{g\ Ti-Hr}\right)$ | Isotac Index (%) | React Time (Min) | % Conv |
|---|---|---|---|---|---|
| A | None | 307 | 96.0 | 180 | 59.1 |
| B | Poly(Maleic Anhydride-co-5-Ethylidene-2-Norbornene) | — | — | 4,320 | 0.0 |
| C | Poly(Maleic Anhydride-Styrene) | 0.1 | — | 5,340 | 3.2 |
| 1 | Poly(Maleic Anhydride-co-5-Ethylidene-2-Norbornene) | 4,382 | 54.0 | 8 | 90.0 |

TABLE I-continued
Polymerization of Alpha-Olefins With a
Ziegler-Type Catalyst Supported on a
Magnesium Treated Maleic Anhydride Copolymer

| Exam | Support | Activ $\left(\frac{g\ PP}{g\ Ti-Hr}\right)$ | Isotac Index (%) | React Time (Min) | % Conv |
|---|---|---|---|---|---|
| 2 | Poly(Maleic Anhydride-Styrene) | 6,950 | 52.0 | 8 | 39.2 |
| 3 | Poly(Maleic Anhydride-co-5-Norbornene-2,3-Dicarboxylic Acid Anhydride) | 3,020 | 56.1 | 25 | 86.0 |
| 4 | Poly(Maleic Anhydride-Norbornene) | 2,010 | 53.0 | 8 | 91.0 |
| 5 | Poly(Maleic Anhydride-co-5-Norbornene-2,3-Dicarboxylic Acid) | 3,610 | 62.0 | 16 | 72.0 |

Although only a few embodiments of the present invention have been specifically described, it should be appreciated that many additions and modifications can be made without departing from the spirit and scope of the invention. These and all other modifications are intended to be included within the scope of the present invention, which is to be limited only by the following claims.

We claim:

1. A catalyst comprising a Ziegler-type transition metal complex and a non-rubber support which has been treated with a Group IIA metal halide or Group IIA metal alkyl halide, the support comprising an interpolymer of an alpha, beta-unsaturated dicarboxylic acid, anhydride or ester thereof and a monomer copolymerizable therewith.

2. The composition of claim 1 wherein the alpha, beta-unsaturated dicarboxylic acid, anhydride or ester thereof is maleic anhydride.

3. The composition of claim 1 wherein the Group IIA metal is selected from the group consisting of beryllium and magnesium.

4. The composition of claim 1 wherein the Ziegler-type complex comprises a compound of a transition metal from Groups IV to VIII and an organo metallic compound selected from Groups I to III.

5. The composition of claim 4 wherein the transition metal is titanium and the organo metallic compound is an aluminum compound.

6. The composition of claim 1 wherein the monomer copolymerizable therewith contains an olefinic cyclic structure.

7. The composition of claim 6 wherein the olefinic cyclic monomer is a styrene.

8. The composition of claim 6 wherein the olefinic cyclic monomer is a norbornene.

9. The composition of claim 1 wherein the interpolymer is treated with a Group IIA metal halide.

10. The process of claim 1 wherein the interpolymer is treated with an Group IIA metal alkyl halide.

* * * * *